Oct. 4, 1927.
H. W. KRAMER
1,644,478
HANDLE FOR WOODEN BASKETS
Filed April 2, 1926     4 Sheets-Sheet 1
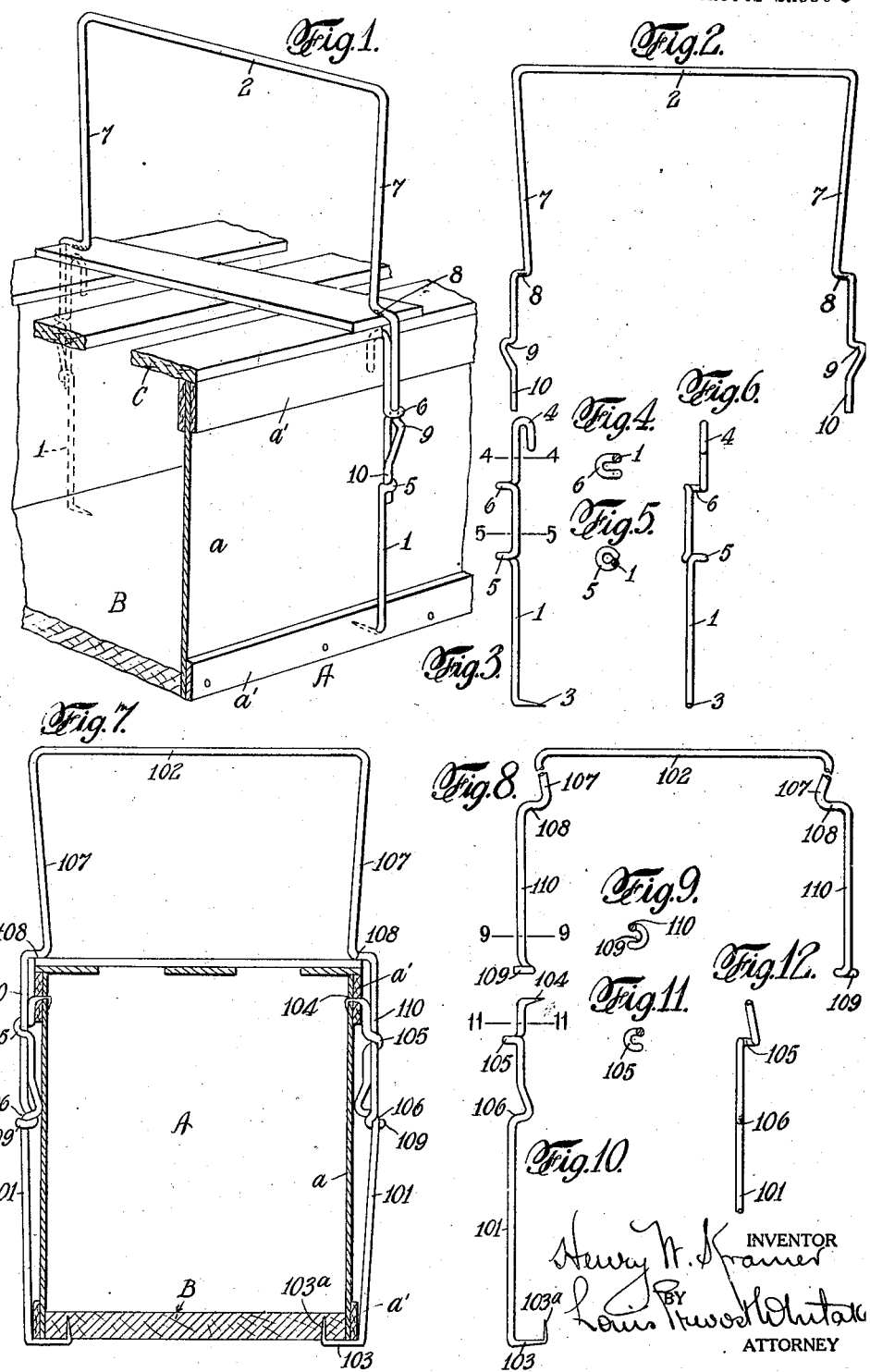

Oct. 4, 1927. 1,644,478
H. W. KRAMER
HANDLE FOR WOODEN BASKETS
Filed April 2, 1926     4 Sheets-Sheet 2
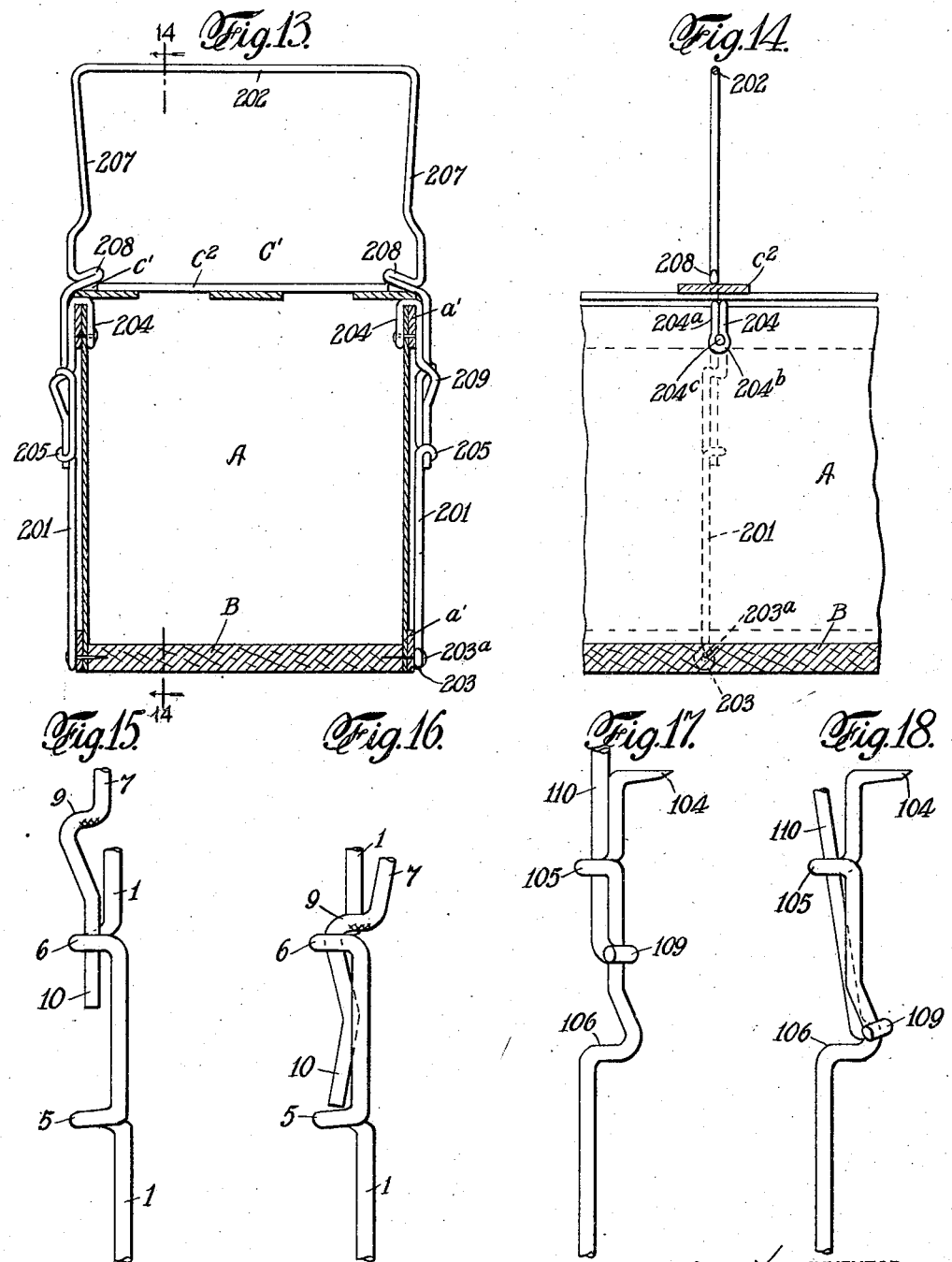

Oct. 4, 1927.
H. W. KRAMER
1,644,478
HANDLE FOR WOODEN BASKETS
Filed April 2, 1926    4 Sheets-Sheet 3
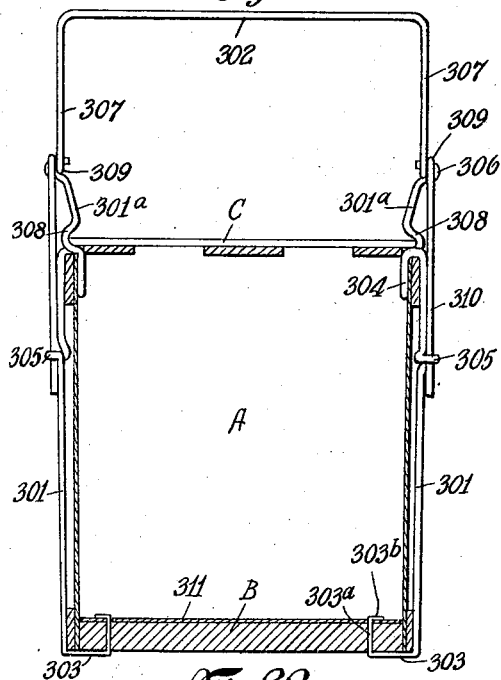
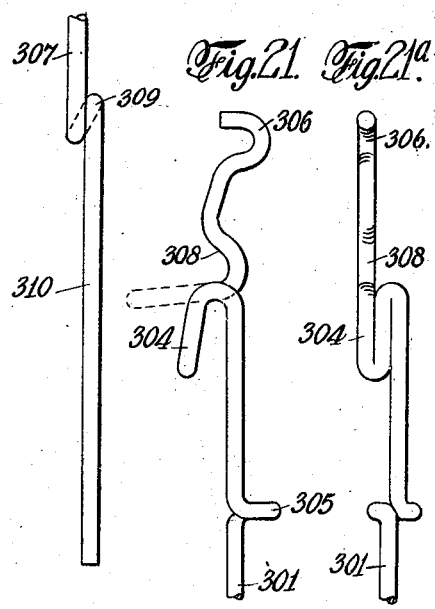
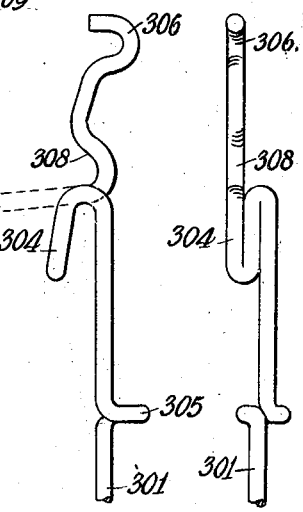
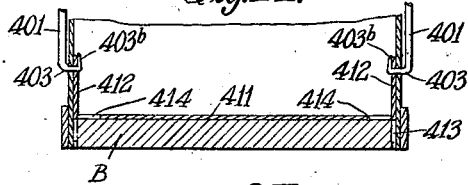
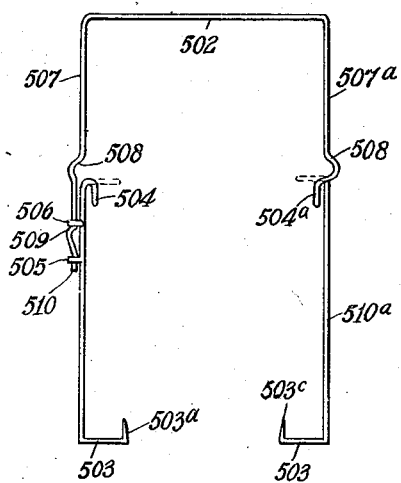
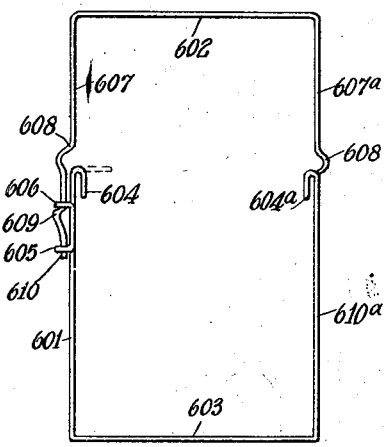
INVENTOR
Henry W. Kramer
BY
Louis Prescott Whitaker
ATTORNEY Oct. 4, 1927. 1,644,478
H. W. KRAMER
HANDLE FOR WOODEN BASKETS
Filed April 2, 1926    4 Sheets-Sheet 4

Patented Oct. 4, 1927.

1,644,478

UNITED STATES PATENT OFFICE.

HENRY W. KRAMER, OF KINGSTON, NEW YORK, ASSIGNOR TO RALPH P. YOUNG, OF MARLBORO, NEW YORK.

HANDLE FOR WOODEN BASKETS.

Application filed April 2, 1926. Serial No. 99,214.

My invention consists in the novel features hereinafter described, reference being had to the accompanying drawings which illustrate several embodiments of the same, selected by me for purposes of illustration, and the said invention is fully disclosed in the following description and claims.

The object of my invention is to provide a metallic handle for supporting and carrying a wooden basket of the type ordinarily used for transporting and holding grapes, or other fruits and vegetables, etc. According to the preferred form of my invention, the handle comprises side members adapted to be attached to the basket, and which may be so attached to the basket at the factory where the latter is constructed, without interfering with the nesting of the baskets for shipment to the point where they are to be filled, and a separate bail member, which is adapted to be detachably connected with the side members, by simply springing the interengaging parts together, without the use of tools, the bail member when once connected with the side members, being held rigidly in engagement therewith against accidental displacement. The side members are preferably attached to the basket both at the top and at the bottom, the latter connection being so effected as to connect the side pieces with the heavy solid bottom with which these baskets are usually provided, so that when the handle is completely assembled in connection with the basket, it will support the basket and contents from the bottom without undue strain on the sides, and the handle is also so constructed as to reinforce the basket laterally, or transversely against outward spreading, and is also provided with means for holding the detachable cover in place when desired.

My present invention is an improvement on the form of handle illustrated, described and claimed in my former patent of the United States, No. 1,571,551, granted February 2, 1926. In that patent the side members of the handle were provided with locking shoulders and guiding portions extending above the basket to cooperate with guiding and locking portions formed on the opposite ends of the bail. According to my present invention, the side members of the handle are provided with locking and guiding portions, which are preferably located below the level of the top of the basket, that is to say, between the attaching means for said side pieces, and the side portions of the bail are correspondingly extended below the top of the basket to engage said guiding and locking portions. My invention also includes forms of handle in which the locking and guiding portions of the side pieces are located, the one below, and the other above the level of the top, or upper edge, of the basket, the side portions of the bail member being in either case extended below the top, or upper edge of the basket, which construction imparts great strength to the structure of the handle itself, and also assists in stiffening the basket centrally, to avoid spreading, and also facilitates the attachment of the side members to the basket, as hereinafter described.

My present invention also includes other features of construction and combination of parts hereinafter fully described and particularly pointed out in the claims.

Referring to the accompanying drawings,

Fig. 1 is a perspective view, partly in section, of a portion of a basket showing the preferred form of the handle, embodying my present invention attached thereto, in operative position, and holding the basket cover against displacement.

Fig. 2 is a detail view of the bail member of the handle shown in Fig. 1.

Fig. 3 is a detail view of one of the side members shown in Fig. 1.

Figure 25:
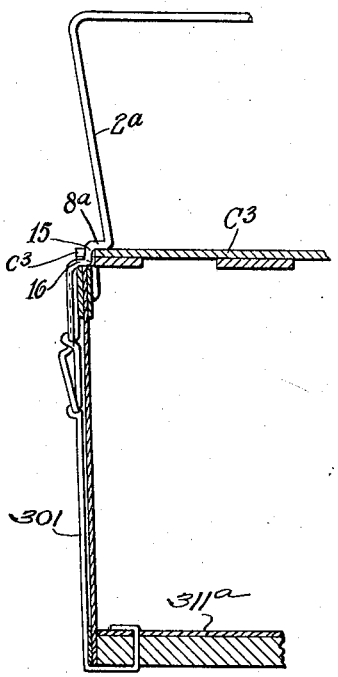

Figs. 4 and 5, are, respectively, horizontal sections of Fig. 3 on the dotted lines 4—4 and 5—5.

Fig. 6 is a front view of the side member illustrated in Fig. 3.

Fig. 7 represents a cross sectional view of a basket provided with a slightly modified form of handle, in which the guiding portions of the side members are located above the locking portions instead of below them as in the form shown in Fig. 1, and the positions of the interengaging portions of the handle arms are correspondingly changed.

Fig. 8 is a detail view, partly broken away, showing the bail member illustrated in Fig. 7.

Fig. 9 represents a horizontal section on the line 9—9 of Fig. 8.

Fig. 10 represents a detail view of one of the side members illustrated in Fig. 7.

Fig. 11 represents a sectional view on the line 11—11 of Fig. 10.

Fig. 12 represents a partial elevation of the side member shown in Fig. 10, taken at right angles thereto.

Fig. 13 is a view similar to Fig. 7, showing another slightly modified form of handle.

Fig. 14 represents a section of Fig. 13, on the line 14—14.

Figs. 15 and 16 are enlarge detail views of the interengaging portions of the bail member, one of the side members illustrated in Figs. 1 to 6, illustrating the manner of engaging the same.

Figs. 17 and 18 are similar views, showing the manner of engaging the bail member and one of the side members of the form of handle illustrated in Figs. 7 to 12.

Fig. 19 is a view similar to Fig. 7 showing another slight modification of the invention, in which the guiding and locking portions of the side members are located one below the top of the basket, and one above the same.

Figs. 20 and 21 are enlarged detail views of the interengaging portions of the bail member, and one of the side members.

Fig. 21ᵃ shows the parts illustrated in Fig. 21, turned at an angle of 90°.

Fig. 22 is a detail sectional view of the lower portion of the basket, showing a different means for connecting the lower ends of the side members with the basket.

Fig. 23 illustrates a slightly modified form of handle, in which one of the side members is formed integral with the bail.

Fig. 24 illustrates another slight modification, in which both of the side members and the bail are formed from a single piece of wire or rod.

Figs. 25, 26, 27 and 28 are detail views illustrating slight modifications in the handle members for preventing longitudinal movement of the basket cover.

Referring to the form of my invention illustrated in Figs. 1 to 6, inclusive, A, represents a wooden basket provided with the usual solid bottom, B, veneer sides, *a*, veneer strips, *a'*, and removable lid or cover, C, which may be of any usual or preferred construction. My improved handle comprises the two side members, indicated at 1—1, and a separate bail member, 2, adapted to be detachably interengaged with the side members. Each of the side members is provided with means for attaching it to the basket in such a manner that the lifting strain of the complete handle when attached thereto in lifting the basket and contents, will be transferred to the bottom of the basket. To this end the lower end of each side member is shown as provided with an angular attaching point, 3, which may be driven into the side of the basket and into the bottom, B, as indicated in Fig. 1. The upper end of the side member may be similarly provided with an attaching point, if desired, as indicated in the modified form, Fig. 10, for example, but I prefer to provide it with an inwardly and downwardly curved, retaining bend, or portion, indicated at 4, which is slipped over the upper edge of the basket before the point, 3, is driven into the bottom. One advantage of this construction is that the distance from the retaining portion, 4, to the retaining point, 3, of the side member may be made such as to bring the point, 3, substantially centrally between the upper and lower faces of the bottom, B, which is of considerable thickness, when the retaining portion, 4, is hooked over the upper edge of the basket, thus insuring that the point, 3, will always be driven properly into the bottom of the basket. It also forms a guide to insure that the portion of the bail member designed to hold down the cover of the basket, as hereinafter described, will be brought to exactly the proper relation with respect to the upper edge of the basket when the bail member is connected with the side members, as hereinafter described. In this form of my invention, the side member is provided with a guiding portion in the form of a closed loop, of the wire or bar of which the side portions are formed, indicated at 5, and a locking portion in the form of an open loop, 6, as clearly shown in Figs. 1, 3, 4, 5 and 6. In this instance the guiding portion, 5, is located a distance below the locking portion, 6, and both are located between the upper and lower ends of the side pieces, 1. The bail member, 2, is provided with downwardly extending arms, 7—7, each of which is provided with a horizontal shoulder, 8, adapted to engage and hold the cover, C, in position, as shown in Fig. 1. At a predetermined distance below the shoulder, 8, each of the arms, 7, is provided with a downwardly extending locking shoulder, indicated at 9, adapted to interengage with the locking portion, 6, of one of the side members, 1, and each arm, 7, is provided with a downwardly extending portion, 10, extending sufficiently below the shoulder, 9, to enable it to enter the guiding loop, 5, of one of the side members, 1, when the bail member is interlocked with the side members.

In Figs. 15 and 16 I have illustrated the manner in which the bail member is engaged with the side members. It will be understood that the side members, 1, may be attached to the basket at the time it is manufactured at the factory, in which case they will in no way interfere with the proper nesting of the baskets for shipment and the required number of bale members for all of the baskets in the nests can be readily contained within the topmost basket of the nest. Obviously, the side pieces could be attached to the basket after it is received by the user or packer, if that is preferred, but ordinarily it will probably be convenient to attach the side pieces at the factory where the baskets are made, and furnish the bail members with the baskets. When it is desired to attach a bail member to a basket so provided with the side members, 1, the lower ends, 10, of each of the arms, 7, of the bail member, will be inserted in the open slot, or locking member, 6, of one of the side members, 1, as indicated in Fig. 15, and the bail member will be forced downwardly so as to enter the part, 10, and pass into the closed guiding member, 5. The locking portions, 9, of the arms, 7, engaging the locking portions, 6, will cause the arms, 7, to be sprung inwardly in the manner indicated in Fig. 16 until the part, 10, enters the guiding member, 5, and the locking member, 9, passes below the locking member, 6, when the arms, 7, will spring outwardly into the position shown in Fig. 1, in which both arms, 7, are firmly locked to the side members, 1—1, with the horizontal shoulders, 8, in proper position to receive and hold the cover, C, or lid, against accidental displacement. It will be seen that, while it is physically possible to disengage the bail member from the side members in case it should ever be desired to do so, the connection is to all intents and purposes perfectly rigid and permanent and the basket can be handled by means of the bail, 2, in exactly the same manner as if the entire handle was made of one piece of metal and permanently secured to the basket, while the weight of the fruit or other contents will be borne entirely by the bottom of the basket, and the sides, a, are not only relieved of strain, but are very materially stiffened against lateral strain by the side members and bail member. It will be seen that by locating the locking and guiding devices of the side pieces below the top edge of the basket and between the extremities of the side pieces, 2, there are, in the first place, no projections above the top edge of the basket prior to the application of the bail, and when the bail member is applied, as indicated in Fig. 1, the downwardly extending portions of the bail, engaging the locking and guiding portions of the side pieces, in the manner shown, produce a stiffening effect reinforcing the side pieces and increasing the efficiency in preventing the lateral spreading of the basket.

In Figs. 7 to 12 I have shown a modified form of handle in which the side members, indicated at 101, are provided each with a guiding portion, indicated at 105, located in this instance adjacent the upper end of the side member, and with a locking shoulder, indicated at 106, at a distance below the guiding portion, and the bail member, 102, has its lateral arms, 107, provided with the usual cover retaining shoulder, 108, and depending portions below said shoulder, providing straight portions, 110, to engage the guiding portions, 105, of the side members, and having at their lower extremities, an open loop, indicated at 109. The side members may be secured to the basket in the same manner as indicated in Fig. 1, if preferred, but in this particular instance I have shown the lower ends of the side members provided with inwardly bent portions, 103, to extend below the bottom, B, of the basket, A, and having a vertically disposed point, 103$^a$, which is driven upwardly through the bottom of the basket, and the upper end of each side piece is provided in this instance with a clinching point, indicated at 104, which may be driven through the side, a, of the basket, and the upper band, or bands, a', and clinched as shown. In this construction the advantages hereinbefore described are secured, but the relative positions vertically of the locking and guiding means on the side pieces and on the lower ends of the bail arms are reversed.

In Figs. 17 and 18 I have illustrated the manner in which the bail member is made to engage with the side members. As indicated in Fig. 7, each arm, 107, of the bail member, is made to engage the open loop or guiding member, 105, of the side member, and the locking member, 109, of the arm, 107, engages an intermediate portion of the side member between the guiding member, 105, and the locking shoulder, 104. The bail member is then pressed downwardly, with the effect of springing the ends as the locking member, 109, slides over the locking shoulder, 104 (see Fig. 18), and when the parts are in engagement, as shown in Fig. 7, they will be held in position by the natural resilience of the metal against accidental displacement.

In Figs. 13 and 14 I have illustrated a slightly modified form of handle of the type shown in Figs. 1 to 6 inclusive, with slight variations hereinafter described, the corresponding parts of the handle structure being indicated by the same numbers which appear in Figs. 1 to 6, with 200 added. In this instance the upper end of the side member, 201, is bent over and downwardly, as at 204, to engage the top edge of the basket, and is then bent upwardly, as indicated at 204$^a$, to form a loop, 204$^b$ (see Fig. 14), through which a tack, 204$^c$, or nail, may be driven to prevent the lateral movement of the hook shaped portion, 204, if this is deemed to be desirable. The lower end of each side member instead of being provided with a point, is provided with a loop, 203, through which a tack, or nail, 203$^a$, may be driven through the side of the basket and into the bottom. Obviously the side pieces shown in Fig. 1, or in Fig. 7, could be attached to the basket in this manner, if it was preferred. The bail member, 202, is provided with a cover retaining shoulder, 208, in the form of a portion of the wire bent upon itself, as shown, and having portions extending below the plane of the top of the cover, to engage a notch, $c'$, in the cover, $C'$, or in the crossbar, $c^2$, forming part of the same, or both, and having its inner end so disposed as to rest upon the solid portion of the cover, thus not only holding the cover down on the basket, but locking it against endwise movement.

In some instances, instead of having both the interlocking parts of the handle and of the side pieces located below the plane of the upper edge of the basket, I may have one of said interlocking parts of each located below said plane, and the other above the same, as indicated in Figs. 19 to 21, for example. In these figures, the side members, 301, are each provided with a guiding portion, 305, in the form of a closed loop, located in such position as to be below the top of the basket, while the side member is provided with an upwardly extending portion, indicated at $301^a$, provided at its upper end with a locking hook or shoulder, 306. An intermediate portion of the side member between the parts, 305 and 306, is provided with an outwardly extending portion bent backwardly on itself to form a hook-shaped portion, 304, as indicated in Fig. $21^a$, to engage the top edge of the basket, and in this instance the lower end of the side member, 301, is provided with a form of attachment similar to that shown in Figs. 7 and 10, having a horizontally bent portion, 303, and a vertical point, $303^a$, adapted to extend upwardly through the bottom of the basket. In this instance the points, $303^a$, are shown of sufficient length to penetrate entirely through the bottom of the basket, and they are shown as passing through apertures in a metal tie-plate, indicated at 311, extending transversely across the bottom of the basket, and clinched thereon, as indicated at $303^b$. This adds strength to the bottom of the basket and prevents the spreading of the basket adjacent to the bottom thereof. This tie-plate can also be used with the other forms of side pieces and bail members previously described, by providing the lower ends of the side members with this form of attaching means, and this construction will be found very desirable for light baskets and those made of fragile material, as cardboard, paper mache, and light veneers, for example, although its use is not absolutely necessary. Where this form of attachment is used at the lower ends of the side members, that is, a point, as $303^a$, extending upwardly through the bottom, B, of the basket, in connection with the hook-shaped portion, 304, for connecting the side member to the top edge of the basket, it will be found convenient to construct the side members with the portion, 304, extending perpendicularly thereto, as indicated in dotted lines in Fig. 21, so that it can be passed over the top of the basket after the lower end of the side member is secured at the bottom, and it can then be bent downwardly by a pair of pliers or other tool, into the position shown in full lines in Figs. 19, 21 and $21^a$. In Fig. 19 I have shown the bail member, 302, having its side arms, 307, provided with locking portions, 309, in the form of a closed loop, disposed substantially vertically, to engage the locking portions, 306, at the upper end of the side member, and said arms, 307, are each provided with a straight downwardly extending guiding portion, 310, adapted to pass through the guiding portion, 305, or closed loop, of the adjacent side member, which, as before stated, is located below the top edge of the basket. In this construction the handle supports the weight of the contents from the bottom of the basket, as in the preceding forms, and the overlapping portions of the handle and side members extend downwardly well below the top edge of the basket, as in the forms of my invention previously described, so as to stiffen the handle structure adjacent to the upper edge of the basket, and prevent the lateral spreading of the basket by the weight of its contents, or otherwise.

In Fig. 22 I have shown a slight modification of the means for attaching the lower ends of the side members to the basket, and at the same time bracing the bottom portion of the basket transversely. In this instance the bottom of the basket is provided interiorly with a horizontal, metal plate, 411, extending transversely thereof, and provided with upturned end portions, 412. This plate may also be provided with piercing points as indicated at 413, which may be conveniently stamped out of the plate, 411, as indicated by the openings, 414, at any point along the length of said plate, and driven down into the bottom of the basket. The upwardly bent end portions, 412, are provided with apertures through which horizontal points, 403, on the lower ends of the side members, partially illustrated at 401, may pass when driven through the sides of the basket, and these points may be clinched, as indicated at $403^b$. The plate, 411, would, therefore, serve to act as a tie plate to hold the basket transversely and centrally at the bottom, and prevent the spreading of the basket at that point, and this construction may be used where, and if desired.

It will also be understood that it is within the scope of my invention to form any of the embodiments of my improved handle with one of the side members integral with the bail member, that is from the same piece of wire, and also with both of the side members integral with the bail member if this is found to be advantageous, or desirable. Thus, in Fig. 23, I have illustrated an embodiment of my improved handle substantially like that shown in Fig. 1, except that one of the side members is formed integral with the bail member. In this instance the separate side member is indicated at 501, and is provided at the upper end with the hook shaped portion, 504, to engage the top edge of the basket, and at the lower end with a horizontal portion, 503, and upwardly extending point, 503ª, to be driven upwardly through the bottom of the basket. As previously stated, it will be desirable to form the part, 504, originally as extending horizontaly parallel to the part, 503, as indicated in dotted lines in Fig. 23, and bend it down over the edge of the basket after the point, 503ª, has been driven up through the bottom, but obviously the side member, 501, could be provided with any of the other means of attachment at the top and bottom herein shown. The side member, 501, is provided with the locking member, 506, in this instance in the form of an open loop, and with the guiding member, 505, in this instance in the form of a closed loop, as in Fig. 1. The bail member, 502, is provided at one side with a downwardly extending arm, 507, provided with the cover retaining shoulder 508, and with the locking shoulder, 509, and guiding portion 510, in this instance exactly as shown in Fig. 1, the other arm, 507ª of the bail member being provided with the cover engaging shoulder, 508, a downwardly extending portion, 504ª, bent backward on itself in the manner indicated in Fig. 21ª, at 304, to engage the top edge of the basket, and which can be formed horizontally as indicated in dotted lines, before the application of the handle to the basket, and the said bail member arm, 507ª, is extended downwardly, as at 510ª, to form, integrally with the bail, the other side member, the lower end of the part, 510ª, being bent inwardly, as at 503ᵇ; and provided with a point, 503ᶜ, to be driven up through the bottom of the basket. In applying this form of handle to the basket, the separate side member, 501, may be attached to the basket at the factory, or not, as preferred, as its presence would not interfere with the nesting of the baskets. To attach the remaining portion of the handle, the point, 503ᶜ, is driven up through the bottom, the part, 504ª, placed in engagement with the upper edge of the basket, and bent downwardly to secure the side portion, 510ª, and the bail arm, 507ª, in position, and the other bail member, 507, is engaged with the separate side member in exactly the same manner as previously described.

In Fig. 24 I have illustrated another slight modification of my invention, in which the entire handle is formed of a single piece of wire. In this instance the side member, 601, is formed integral with the side member, 610ª, and is connected thereto by a horizontal portion of the wire, indicated at 603, which extends across and below the bottom of the basket, the upper end of the member, 601, being provided with suitable attaching means, as the hook portion, 604, for attaching it to the upper edge of the basket, and the side member, 610ª, being provided with a similar attaching means, indicated at 604ª. The side member, 601, is provided with the locking member, 606, in this instance an open loop, and a guiding member, 605, in this instance a closed loop, similar to the corresponding parts in Fig. 1. The bail member, 602, which is formed of the same piece of wire as both of the side members and the bottom member, 603, has one arm, 607ª, provided with the cover retaining shoulder, 608, and is integral with the side member, 610ª, as previously described with reference to Fig. 23. The other arm, 607, is provided with the cover engaging shoulder, 608, and with the locking portion, or shoulder, 609, and guiding terminal portion, 610, in the manner shown in Figs. 1 and 23. This unitary handle will be most advantageously applied to the basket at the place where it is filled by placing the hook portion, 604ª, in engagement with the upper edge of the basket on one side, bringing the portion, 603, underneath the bottom of the basket, engaging the part, 604, with the other side of the basket, and bending it down into the position shown in full lines in Fig. 24, after which the arm, 607, may be sprung into engagement with the portions, 606 and 605, of the side piece, 601, in the manner previously described.

It will be seen that the form of handle illustrated in Figs. 23 and 24, will efficiently support the contents of the basket from the bottom thereof, and prevent the lateral spreading of the upper end of the basket, and the form shown in Fig. 24, in which the single wire from which the entire handle is formed, extends across the bottom of the basket, also reinforces the lower portion of the basket and prevents spreading at that point.

It is to be noted that in all the forms of my invention herein shown and described, the interengagement of the interengaged guiding portions of the side members and bail arms serves to hold the interengaged locking portions against accidental disengagement, and by making the bail or the side pieces, or both, of resilient material, the bail may be forcibly applied, or sprung into locking engagement with the side pieces, when desired, and cannot be disengaged without the exertion of sufficient force, intentionally, exerted, for the purpose of springing the parts out of engagement.

It is desirable to construct the member, or members of the handle which engage the cover, and the cover itself, in such manner that when the cover is put in place, it will not only be held against vertical movement with respect to the basket, but will also be locked against endwise movement. In Fig. 13 I have shown one such construction in which the cover retaining portions of the bail member engage notches in the cover as well as solid portions of the same, so as to lock it against both vertical and endwise movement. In Figs. 25 to 28 inclusive, I have shown some further slight modifications of the cover engaging portions of the handle, which may be employed for the same purpose. It will be understood that these basket covers may be formed of a single piece of wood, but are usually made up of slats or strips of veneer extending lengthwise of the basket, and connected by a number of transverse slats extending over the top of the longitudinal slats, one of which transverse slats is located centrally of the length of the cover. This is the usual and well known construction. According to this feature of my invention, the cover is provided on opposite sides with a slot or notch which may be made in the transverse slat, or cleat, alone, or which may be made both in the transverse slat or cleat and in the longitudinal slat beneath. Where this type of cover is employed, and the cover engaging portion, whether forming part of the bail member or of the side members of the handle, may conveniently be provided with a shoulder to engage the top surface of the cover, that is, the transverse slat or cleat, and with locking portions to engage the adjacent locking notch in the edge of the cover.

In Fig. 25, for example, which illustrates a handle constructed substantially as heretofore described with reference to Figs. 1 and 2, the bail member, $2^a$, is provided with the cover retaining shoulder, $8^a$, extending outwardly and provided with a vertically disposed locking portion, indicated at 15, which in this instance extends downwardly from the locking shoulder, $8^a$, in such position as to engage a notch or open slot, $c^3$, in the cover, $C^3$, which slot extends through both the transverse slat, or cleat, of the cover, as well as the outer longitudinal slat, or cleat, so that when the cover is in position it will be firmly held by the shoulder, $8^a$, against vertical movement, and will also be held by the locking portion, 15, against longitudinal movement. As the lateral portions of the bail extend downwardly on the outside of the basket in this form of the handle, and are provided with locking and guiding portions, to interengage with the locking and guiding portions of the adjacent side member, as previously described with reference to Figs. 1 and 2, there will naturally be a horizontal portion, indicated at 16 at the lower end of the vertical locking portion, 15, which also lies within the notch, $c^3$, and assists in preventing longitudinal movement of the cover. In this figure I have also shown the side members, 301, provided at their lower ends with upwardly extending portions engaging a tie plate, $311^a$, as in Fig. 19.

Figure 26:
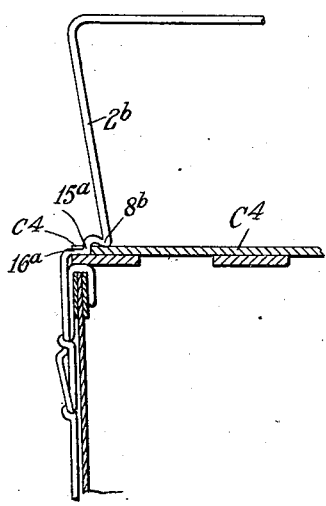

Fig. 26 shows a similar construction, in which the locking notch in the cover, indicated at $c^4$, is formed only in the transverse slot, indicated at $C^4$, and the bail member, $2^b$, is provided with the shoulder, $8^b$, to engage the top of the transverse cleat, and with a locking portion comprising the vertical portion, $15^a$, horizontal portion, $16^a$, which engage the notch, $c^4$, thus holding the cover against vertical and longitudinal movement.

Figure 27:
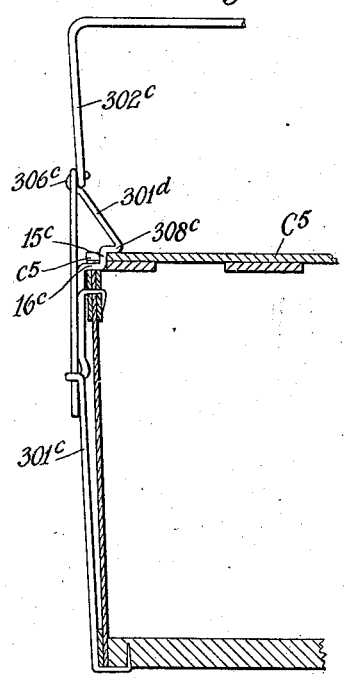

Fig. 27 illustrates a slight modification of the form of handle illustrated in Figs. 19 and 20, in which the cover engaging portion is on the side member instead of the bail member. In this figure, the side member, indicated at $301^c$, has its upper end portion, $301^d$, which extends above the upper edge of the basket, and carries the locking portion, $306^c$, at its upper end, provided with a shoulder, $308^c$, provided with a vertical locking portion, $15^c$, engaging a notch, $c^5$, which extends both through the transverse slat, or cleat, $C^5$, and one of the longitudinal slats of the cover, as in Fig. 25, and its also provided with a horizontally disposed portion, $16^c$, which also engages the slot, $c^5$, thereby holding the cover down and against longitudinal movement in precisely the same manner as illustrated in Fig. 25, except that the cover retaining portions are on the side members instead of on the bail members. The interengaging, locking and guiding portions of the bail member, $302^c$, and side members, $301^c$, are constructed and operate in the same manner in this instance as previously described with reference to Figs. 19 to $21^a$, inclusive.

Figure 28:
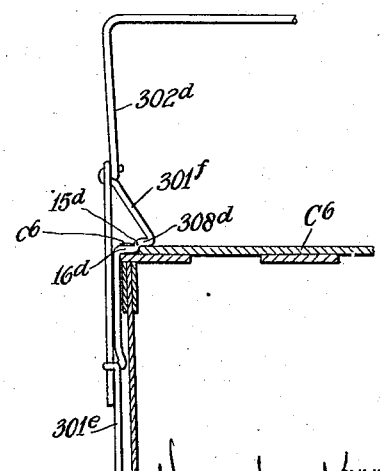

Fig. 28 shows another slight modification in which the side member, here lettered $301^e$, has its upwardly projecting portion, $301^f$, provided with a cover engaging shoulder, $308^d$, a vertically disposed locking portion, $15^d$, and horizontally disposed portion, $16^d$, engaging the notch, $c^6$, which in this instance is made only in the transverse slat, or cleat, indicated at $C^6$, the bail member, $302^d$, and side member, $301^e$, being provided with interengaging locking and guiding portions in the manner previously described with reference to Figs. 19 to $21^a$. It will thus be seen that the cover may be provided with notches at opposite sides, which may extend part way below the surface, or entirely through the cover, as desired, and that the cover engaging portions of the handle, which may form part of the bail member, or of the side members, will be constructed to engage such notches so as to hold the cover against both vertical and longitudinal movement.

What I claim and desire to secure by Letters Patent is:—

1. In a handle for baskets, a metallic side member, provided with a guiding portion, and a locking portion at a distance therefrom, longitudinally, at least one of said portions being located in position to be held at a point below the upper edge of the basket, and a detachable bail member having a guiding portion to engage the guiding portion of the side member, and a locking portion to interlock with the locking portion of the side member, portions of said bail member extending below the top edge of the basket and overlapping the adjacent portions of the side member, and reinforcing the upper edge of the basket against spreading.

2. A handle for baskets, comprising a metallic side member, provided with a guiding portion, and a locking portion, at a distance therefrom longitudinally, both of said portions being located below the upper edge of the basket when the side member it attached, a detachable bail member having a depending arm at one side, provided with a guiding portion to engage the guiding portion of the side member, and a locking portion to interlock with the locking portion of the side member, and means for connecting the bail member with the other side of the basket, the overlapping portions of said bail member and side member reinforcing each other and holding the upper edge of the basket against spreading.

3. A handle for baskets, comprising side members, provided adjacent to their upper and lower ends with means for attaching them to the basket adjacent to the upper edge and the bottom thereof, each of said side members being provided with a guiding member and a locking member, located at separated points longitudinally of the side member, and located between said attaching means, and a bail member having depending arms adapted to extend below the top edge of the basket, each of which is provided with a guiding portion to engage the guiding portion of the side member, and a locking portion to interlock with the locking portion of the side member, the overlapping portions of the bail arms and side members stiffening the handle structure and reinforcing the basket on opposite sides against spreading.

4. A handle for baskets, comprising side members, provided adjacent to their upper and lower ends with means for attaching them to the basket adjacent to the upper edge and the bottom thereof, each of said side members being provided with a guiding member and a locking member located at separated points longitudinally of the side member, and located between said attaching means, and a detachable bail member having depending arms adapted to extend below the top edge of the basket, each of which is provided with a guiding portion to engage the guiding portion of the side member, and a locking portion to interlock with the locking portion of the side member, the overlapping portions of the bail arms and side members stiffening the handle structure and reinforcing the basket on opposite sides against spreading, the guiding and locking portions of the side members and their engaged bail arms being located so as to prevent accidental displacement when the parts are engaged, and at least one of said parts being formed of resilient material, to permit it to yield when said parts are forced into engagement.

5. A handle for baskets, comprising a pair of side members, each provided at its upper end with a hook portion for engaging the upper edge of the basket and with means at its lower end for attaching it to the lower portion of the basket, adjacent to the bottom thereof, each of said side pieces being provided with a guiding portion and a locking portion, and a bail member provided with side arms adapted to extend below the upper edge of the basket, each having guiding portions for engaging the guiding portions of the adjacent side member, and locking portions adapted to interlock with the locking portions of the adjacent side member and providing overlapping portions of said arms and side pieces adjacent to the upper edge of the basket for stiffening the handle structure and reinforcing the basket against spreading.

6. A handle for baskets, comprising a pair of side members each provided with attaching means at its lower end, adapted to be connected with the bottom of the basket, and hook-shaped portions for engaging the upper edges of the basket, each of said side pieces being provided with a guiding portion, and with a locking portion, at least one of which is located between said attaching means, and a bail member provided with side arms, adapted to extend below the top edge of the basket, each provided with guiding portions to engage the guiding portions of the adjacent side member, and locking portions to interlock with the locking portions of the adjacent side member, the interengagement of said guiding portions holding said locking portions in interengaged relation, and said arms and side members providing overlapping portions adjacent to the upper edge of the basket to stiffen the handle structure and reinforce the basket against spreading.

7. A handle for baskets, comprising a pair of side members each provided with attaching means at its lower end, adapted to be connected with the bottom of the basket, and hook-shaped portions for engaging the upper edges of the basket, each of said side pieces being provided with a guiding portion, and with a locking portion, at least one of which is located between said attaching means, and a bail member provided with side arms, adapted to extend below the top edge of the basket, each provided with guiding portions to engage the guiding portions of the adjacent side member, and locking portions to interlock with the locking portions of the adjacent side member, the interengagement of said guiding portions holding said locking portions in interengaged relation, and said arms and side members providing overlapping portions adjacent to the upper edge of the basket to stiffen the handle structure and reinforce the basket against spreading, and a metallic tie-plate located in the lower part of the basket adjacent to the bottom thereof and connecting said side members for transversely reinforcing the basket at the bottom thereof.

8. A handle for baskets, comprising a pair of side members each provided with attaching means at its lower end, adapted to be connected with the bottom of the basket, and hook-shaped portions for engaging the upper edges of the basket, each of said side pieces being provided with a guiding portion, and with a locking portion, at least one of which is located between said attaching means, and a bail member provided with side arms, adapted to extend below the top edge of the basket, each provided with guiding portions to engage the guiding portions of the adjacent side member, and locking portions to interlock with the locking portions of the adjacent side member, the interengagement of said guiding portions holding said locking portions in interengaged relation, and said arms and side members providing overlapping portions adjacent to the upper edge of the basket to stiffen the handle structure and reinforce the basket against spreading, and a metallic tie-plate extending transversely across the bottom of the basket, and provided with apertures to receive the retaining means at the lower ends of said side members for uniting said side plate thereto and to the basket to reinforce the basket transversely adjacent to its bottom portion.

9. A handle for baskets, comprising side members provided with means for attaching them to the basket adjacent to the bottom thereof, and adjacent to the upper edge, said side members being each provided with longitudinally separated guiding portions and locking portions, at least one of which is located below the upper edge of the basket when the side member is in operative position, and a separate bail member provided with downwardly extending side arms, adapted to extend below the upper edge of the basket and each provided with guiding means for engaging the guiding means of the adjacent side member, and locking means adapted to interlock with the locking means of the adjacent side member, the interengagement of said guiding means holding said locking means against accidental disengagement, said bail arms being provided with shoulders on opposite sides for engaging a cover and holding it in engagement with the basket.

10. A handle for wooden baskets, comprising two side members, each provided at its extremities with means for attaching it to the side of a basket adjacent to the bottom and adjacent to the upper edge thereof, each of said side members being provided between its attaching means with a guiding portion and with a locking portion separated longitudinally from the guiding portion, and a bail member provided with downwardly extending side portions adapted to extend below the top edge of the basket and each provided with a shoulder for engaging the cover, a guiding portion to engage the guiding portion of the adjacent side member, and a locking portion to engage the locking portion of the adjacent side member, the interengagement of said guiding portions holding said interengaged locking portions in engagement.

11. A handle for baskets, comprising side members provided with means for attaching them to the basket adjacent to the bottom thereof, and adjacent to the upper edge, said side members being each provided with longitudinally separated guiding portions and locking portions, at least one of which is located below the upper edge of the basket when the side member is in operative position, and a separate bail member provided, with downwardly extending side arms, adapted to extend below the upper edge of the basket and each provided with guiding means for engaging the guiding means of the adjacent side member, and locking means adapted to interlock with the locking means of the adjacent side member, the interengagement of said guiding means holding said locking means against accidental disengagement, said bail arms being provided with shoulders on opposite sides for engaging a cover and holding it in engagement with the basket, and with locking portions adjacent to the said shoulders for engaging recesses in the cover, and prevent longitudinal movement thereof.

In testimony whereof I affix my signature.

HENRY W. KRAMER.